(12) United States Patent
Rowe et al.

(10) Patent No.: US 6,892,182 B1
(45) Date of Patent: May 10, 2005

(54) METHOD AND APPARATUS FOR TICKET GENERATION AND ACCOUNTING

(75) Inventors: Rick Rowe, Reno, NV (US); Bhavani Prasad, Reno, NV (US); Franco Crivelli, Reno, NV (US); Gary H. Sullivan, Carson City, NV (US); Marc A. Espin, Sparks, NV (US)

(73) Assignee: IGT, Reno, NV (US)

(*) Notice: Subject to any disclaimer, the term of this patent is extended or adjusted under 35 U.S.C. 154(b) by 311 days.

(21) Appl. No.: 09/688,775

(22) Filed: Oct. 16, 2000

(51) Int. Cl.$^7$ ................................................ G06F 17/60
(52) U.S. Cl. .......................... 705/14; 463/16; 463/17; 273/138.2; 705/1
(58) Field of Search ...................... 705/14, 1; 463/16, 463/17; 273/138.2, 139

(56) References Cited

U.S. PATENT DOCUMENTS 5,928,082 A * 7/1999 Clapper, Jr. .................. 463/16

5,967,892 A 10/1999 Shoemaker, Jr.

FOREIGN PATENT DOCUMENTS

JP          411253609 A    *   9/1999

* cited by examiner

*Primary Examiner*—Pierre E Elisca
(74) *Attorney, Agent, or Firm*—Beyer Weaver & Thomas LLP

(57) ABSTRACT

A method and apparatus for generating and accounting for vouchers or tickets is disclosed. In accordance with a method of the invention, a voucher is issued by a voucher generation device associated with a gaming system which includes one or more gaming machines and a host. The method includes generating data regarding a voucher to be printed, creating a record regarding the voucher and printing the voucher at the voucher generation device. The generated voucher information is transmitted from the remote voucher generation device to the host. The printed voucher may be presented at the naming machine, with the authenticity of the voucher and its value determined by utilizing the voucher information stored at the host.

9 Claims, 2 Drawing Sheets

METHOD AND APPARATUS FOR TICKET GENERATION AND ACCOUNTING

FIELD OF THE INVENTION

The present invention relates to methods and apparatus for issuing and redeeming tickets and similar items.

BACKGROUND OF THE INVENTION

Gaming machines are well known. One variety of such machines comprise gambling machines. These machines include the well known video poker and slot machine. In general, these gambling machines are arranged to accept a wager from a player, present a game, and then pay the player a winning if the player receives a winning outcome of the game.

These gaming machines may be arranged to accept a player's wager in the form of either paper currency or coin monies. In the past, small winning amounts were commonly paid in coins from a coin hopper located in the gaming machine to a player accessible coin tray. Larger winnings were generally paid by the operator of the machine, such as by check or cash at a cashier window.

It is now common for gaming machines to issue tickets or vouchers in lieu of paper currency or coins. A player may provide credits for playing the game with paper currency. In the event the player does not wager all of the amount credited, the gaming machine may be arranged to issue a ticket representative of the unwagered credit. In the event a player wins the game, the winning amounts may be paid with the ticket.

These tickets may have a variety of forms. Generally, however, a player may redeem the ticket for its representative value in the form of paper currency or coins, such as at a cashier window. The method of issuing tickets has many advantages to the operator of the machine. One primary advantage is that all winning amounts, large or small, can be immediately paid to the player. Another advantage is that the operator does not have to maintain sufficient coins in the machine to ensure that payouts can be paid to the player.

There are several disadvantages to the current ticket dispensing systems. One problem relates to ticket tracking. As will be appreciated, it is important to ensure the authenticity of a particular ticket before it is paid, or else the gaming machine operator will suffer a loss. The ability of the player to redeem the ticket may also be limited, which is an inconvenience to the player.

It is also desired that there be a convenient means for issuing the tickets. In some instances, a gaming machine may be configured to accept a ticket. It is desirable for the player to be able to obtain tickets from a variety of sources and locations for use in providing credit for play of the gaming machine.

SUMMARY OF THE INVENTION

The present invention comprises one or more methods and apparatus for generating tickets or vouchers and accounting for the vouchers.

In one embodiment, the invention comprises a voucher generation and accounting system which comprises at least one gaming device adapted to accept receive credit from a player presented voucher, to present a game for play by a player, and pay an award in the event a winning event is achieved by play of the game. The system also includes a host associated with the gaming device and arranged to transmit information to and receive information from the gaming device. A voucher issuance device is adapted to generate data regarding a voucher, print the voucher, and create a record regarding the voucher, the voucher issuance device communicating with the host and providing voucher information for use by the host in verifying a voucher presented to the gaming device.

One embodiment of the invention comprises a method of issuing a voucher with a remote voucher generation device associated with a gaming system including a gaming machine and a host, comprising the steps of generating data regarding a voucher to be printed, creating a record regarding the voucher, printing the voucher, and transmitting information regarding the voucher from the remote voucher generation device to the host.

In one embodiment, features/functions of the system are distributed to reduce the cost and overhead of operation of the system. In one embodiment, the voucher information is generated at the remote voucher generation device and later transmitted to the host. In another embodiment, the host polls the voucher generation device for voucher information for verifying a particular voucher.

The method and apparatus of the invention are useful in generating promotional and similar vouchers or tickets at a location remote from the location where they may be redeemed. The method and apparatus also provide for verifying the tickets or vouchers, however, to ensure that they are properly payable at the time of presentment.

Further objects, features, and advantages of the present invention over the prior art will become apparent from the detailed description of the drawings which follows, when considered with the attached figures.

DETAILED DESCRIPTION OF THE INVENTION

The invention is a method and apparatus for ticket generation and accounting. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
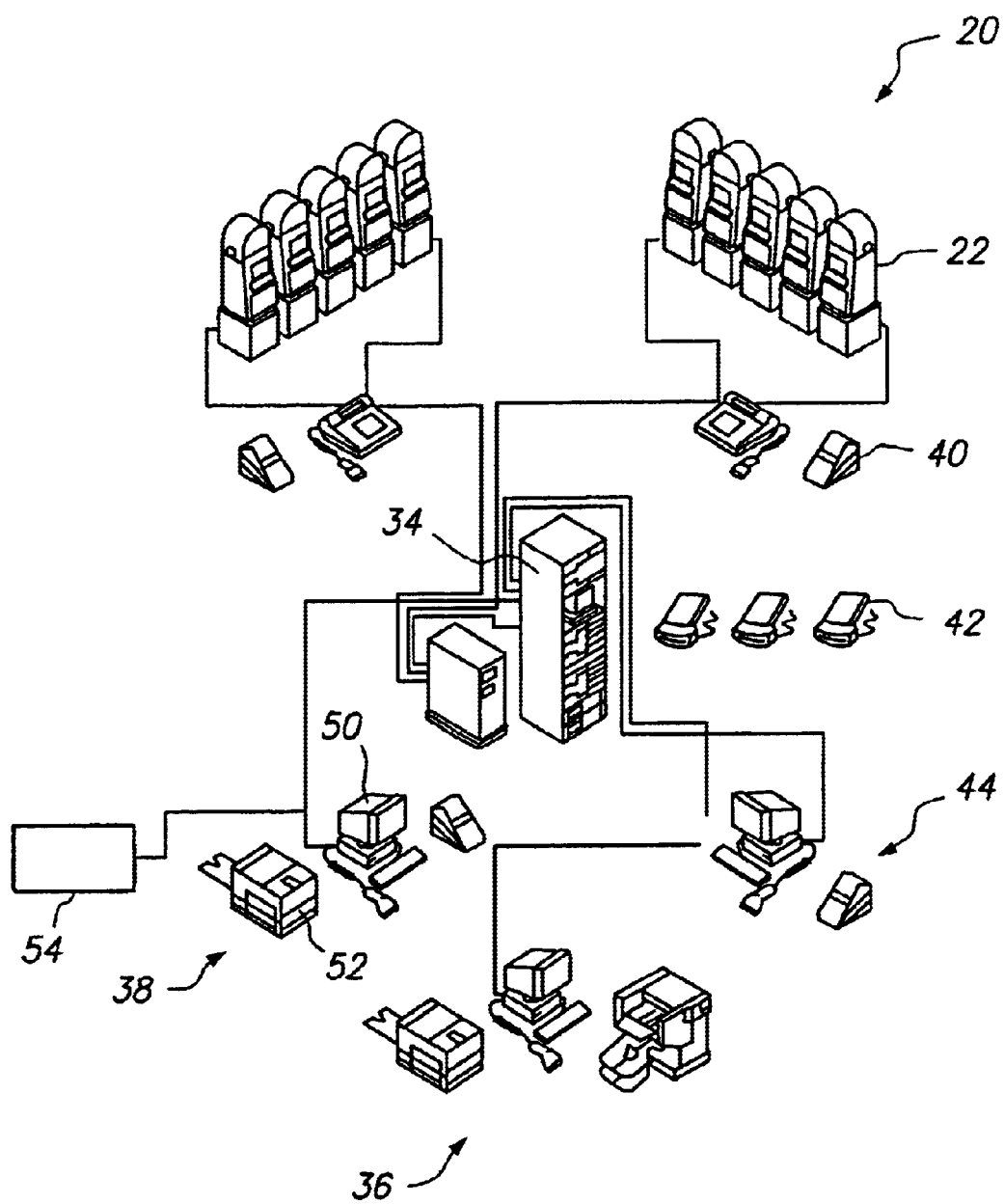
FIG. 1 illustrates a gaming system including a plurality of gaming machines adapted to accept bill monies and vouchers and including a remote ticket or voucher generation and accounting device in accordance with the present invention.

FIG. 1 illustrates one particular environment/application of the ticket generation and accounting method and apparatus of the invention. As described in more detail below, this preferred environment/application comprises a gaming system 20. The method and apparatus of the present invention may be applied to a number of different environments, including but not limited to food service, entertainment shows, promotional game play, or generally to events or activities where tickets, vouchers or the like may be issued and redeemed or used. In such event, the vouchers may not have corresponding monetary value, but may instead have a "redemption" value, in that the voucher may be redeemed or used to obtain the goods/services.

In general, the system 20 includes at least one gaming machine 22. As illustrated, in a preferred embodiment, the system 20 includes a plurality of gaming machines 22. Each gaming machine 22 is arranged to present one or more games to a player. Of course, a wide variety of games now known or later developed may be presented. These games include video poker and slots.

The gaming machines 22 may have a wide variety of configurations. In one embodiment, each gaming machine 22 is adapted to receive a wager, bet, ante or other form of credit which entitles a player to participate in a game. Each gaming machine 22 is arranged to accept the credit in the form of a ticket or voucher 24 (see FIG. 2). In a preferred embodiment, each gaming machine 22 is arranged to accept both bill-type monies and vouchers 24. By bill-type monies it is meant paper money or currency, such as that issued by the U.S. Treasury in $1, $5, $10, $20 and other denominations.

In accordance with the gaming system 20 of the invention, one or more gaming machines 22 capable of accepting (and in one or more embodiments, issuing, as described below) the vouchers 24 are associated with a central host 34. One or more appropriate communications links, whether wired or wireless, permit information to be transferred to and from each gaming machine 22 and the central host 34. The central host 34 may comprise a single computer or a group of computers associated with one another on a network.

In one embodiment, the central host 34 includes at least one data storage element for storing information regarding issued vouchers 24. The data storage element may comprise a hard drive, RAM, ROM, tape drive, CD or other memory or data storage member or element. The central host 34 also includes necessary communications equipment, such as network cards or the like for receiving and sending information.

In one or more embodiments, a variety of sub-systems or devices are associated with the gaming system 20. In one embodiment, a soft count system 36 is associated with the gaming system 20, including the host 34. The soft count system 36 is for use in a soft count process for use in reconciling the amounts received and paid by the gaming machines 22, as is known in the art.

One or more clerk validation mechanisms 40, wireless cashier terminals 42 and cashier cage systems 44 may be associated with the gaming system 20. The manner by which information from these mechanisms, terminals and systems is transmitted to and from other mechanisms, terminals and systems may vary, as known in the art. For example, as illustrated, the wireless cashier terminals 42 may comprise handheld devices adapted to transmit and receive information from the central host 34 via a wireless communications link. The other systems, including the soft count system 36, clerk validation mechanisms 40 and cashier cage systems 44 are illustrated as being hard wired to the central host 34.

The clerk validation mechanisms 40, wireless cashier terminals 42 and cashier cage systems 44 may be arranged to include a variety of apparatus, including both hardware and software, for performing a variety of functions. In one or more embodiments, these mechanisms 40, terminals 42 and systems 44 may include voucher 24 issuing or printing devices, voucher scanning or reading devices and receipt printing devices. In this manner gaming personnel may issue vouchers 24 to players and players may cash-in vouchers 24 after play at a variety of locations.

In the preferred embodiment of the invention, a remote accounting/ticket generation device or system 38 is associated with the gaming system 20. The various aspects of the remote accounting/ticket generation system 38 will be described in more detail below. In general, the remote accounting/ticket generation system 38 is arranged to generate tickets or vouchers 24 for acceptance by the gaming machines 22, and for accounting for these tickets or vouchers.

Figure 2:
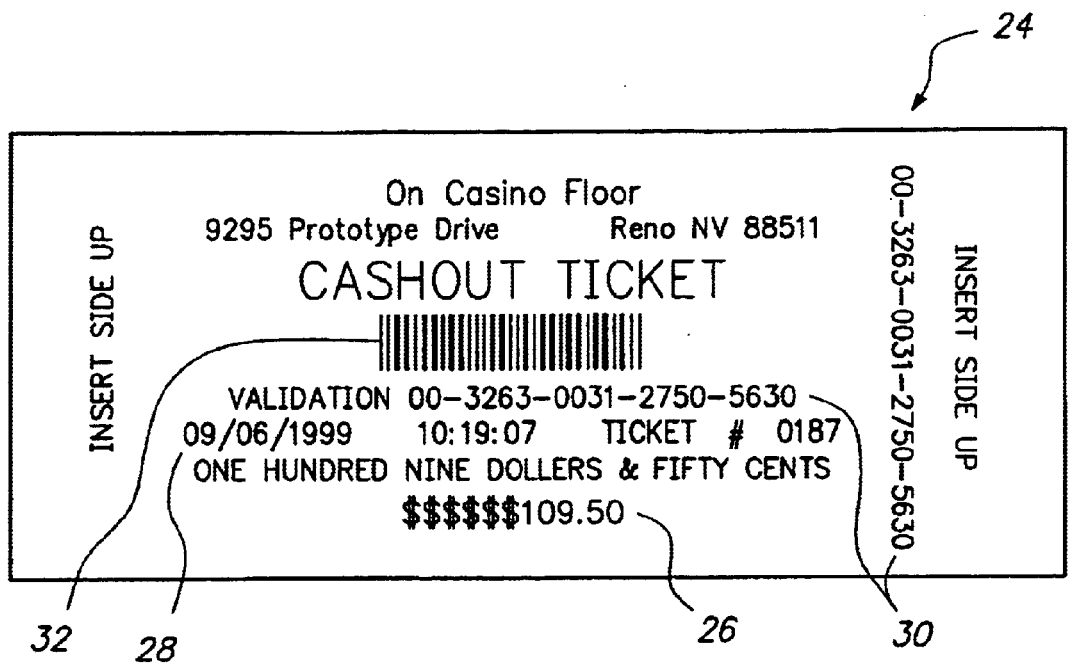
FIG. 2 illustrates a voucher of the type which may be issued/generated with the remote generation and accounting device in accordance with or of the invention.

A voucher 24 of the type which may be issued by the remote accounting/ticket generation system 38 and accepted by a gaming machine 22 is illustrated in FIG. 2. The voucher 24 comprises a ticket-type item having information associated therewith. In a preferred embodiment, information is printed on the voucher 24. In one or more embodiments, the printed information includes information which is in human-readable form, such as a dollar amount 26 identifying the represented value of the voucher 24, a time 28 at which the voucher 24 was issued, a voucher validation code 30 or other unique identifier, and a variety of other information as desired, such as information regarding the gaming machine which issues the voucher 24.

In one or more embodiments, the information associated with the voucher 24 includes machine readable information. As illustrated, this information comprises a UPC type bar-code 32.

In one or more embodiments, the bar-code 32 may represent encoded information such as the value of the voucher 24 and other information. In a preferred embodiment, the bar code 32 represents the validation code or other unique identifier 30. Information such as the value of the voucher 24 is obtainable utilizing the validation code or number 30, this information capable of being located or stored remote from the voucher 24 itself, as described in detail below.

Those of skill in the art will appreciate that the vouchers 24 may take a variety of forms. For example, the vouchers 24 may be constructed of paper, plastic or other material. The information which is associated with the voucher 24 need not be printed thereon. For example, the bar coding may be accomplished with different colors of material comprising the voucher 24, such as by exposing thermoplastic to high heat or the like to generate the spaced bars. The magnetic stripes or chips or similar information storage elements may be associated with the voucher 24 for use in storing the information. Information may be coded in the form of punch holes or other patterns of material or voids of material.

As is well known in the art, when a player provides the necessary credit to the gaming machine 22, the player is permitted to play a game presented by the machine. A player may be permitted to place a variety of different bets utilizing the provided credit. In the event the player is declared a winner of the game, the player is paid an award. The award may be in the form of coins, vouchers 24 or other items of value or elements which may be redeemed for value.

In one or more embodiments, the gaming machine 22 may be arranged to accept a voucher or ticket 24, thus forming a basis by which the player may provide credit to play the game. Though not illustrated in detail, each gaming machine 22 may include a validating mechanism and a storage device for the bill monies and vouchers 24. The validating mechanism is arranged to verify the authenticity of the bill money or voucher 24 which is supplied by the player, thus establishing the right of the player to play the game. For example, the validating mechanism is arranged to reject a counterfeit paper item which a player attempts to pass as a treasury bill. The operation of these mechanisms are well known.

A player may obtain a voucher 24 in several ways. In the event the player is the winner of a game played on one of the gaming machines 22, the player may be issued the voucher 24 representing the award for that win or a number of wins. In one or more embodiments, a player is permitted to receive the voucher 24 instead of a coin or other type of payout when the player elects to "cash-out" and stop playing the gaming machine. When a player elects to cash-out, all credits belonging to the player are paid. These credits include any remaining credit paid by the player to the gaming machine 22 and any winnings for games already played, less any amounts bet.

In accordance with the present invention, a player may receive a voucher 24 which was generated at a remote accounting/ticket generation system 38. The remote accounting/ticket generation system 38 may comprise a wide variety of apparatus. The remote accounting/ticket generation system 38 is referred to herein as a system for the reason that in one or more embodiments, it includes more than one device, and because the devices are capable of performing one or more functions independent of the remainder of the gaming system 20. The remote accounting/ticket generation system 38 may be referred to as an apparatus or device, as in one or more configurations, the functions of the system 38 may be performed by a single unit. In a preferred embodiment, the remote accounting/ticket generation system 38 includes a computing device 50 and a printing device 52. In the embodiment illustrates, these devices 50,52 are separate. As stated above, however, these devices may be integrated into a single unit.

Preferably, the computing device 50 is programmed, such as through appropriate hardware and/or software, to generate a voucher 24. For example, the computing device 50 may be programmed to cause the printing of the information on the voucher 24 illustrated in FIG. 2. This may include means for generating the unique validation code 30, and causing this code 30 to be printed in alpha-numeric form on the voucher 24. In addition, the computing device 50 may include means for encoding the validation code 30 into a bar code 32 format, and causing the bar code 32 to be printed on the voucher 24.

The computing device 50 is also preferably arranged to cause the printing of the voucher value 26. In one or more embodiments, the computing device 50 may be configured to cause the printing of additional information. For example, in the event the voucher 24 is to be issued as a "comp" or complimentary ticket, the voucher 24 may be printed with such information, such as "Complimentary Ticket Redeemable At XYZ Casino."

In one or more embodiments, the computing device 50 is provided with a processor for executing software to accomplish these tasks. The computing device 50 may also include appropriate busses, memories and drivers for generating this information and transmitting it to the 1 printer 52. The printer 52 utilizes this information to effect the printing of the voucher 24.

In a preferred embodiment, the computing device 50 is arranged to generate and store information regarding each voucher 24 which is printed. In one embodiment, the computing device 50 generates one or more data files including information regarding each voucher 24. The one or more data files may include identification information, such as the unique voucher code 30, along with other information pertinent to the voucher 24, such as its assigned value, issue time and date and the like. This information may be stored at a memory of the computing device 50. The memory may comprise a mass storage device, such as a hard drive, tape, CD, or the like, or volatile memory such as Flash Rom, RAM or the like. In one embodiment, a particular file may be associated with a particular voucher 24. In another embodiment, information regarding several vouchers 24 may be associated with or contained in the same data file. The data files may be referred to as records, entries or the like.

In the preferred embodiment of the invention, the remote accounting/ticket generation system 38 is located remote from the central host 34. For example, the central host 34 may be located at the offices of the gaming machine 22 operator, such as a casino. The remote accounting/ticket generation system 38 may be located at a travel agent's office, a tour operator's office, or other location remote from the location where the voucher 24 may be used or redeemed. Of course, in one or more embodiments, the accounting/ticket generation system 38 may also be located at the location where the voucher 24 may be used or redeemed, such as on a casino floor.

One or more embodiments of the invention include methods and apparatus for "accounting" for the vouchers 24 which are issued by the one or more remote accounting/ticket generation systems 38 associated with the gaming or other system. As stated above, when a voucher 24 is generated, a corresponding data file or other record is also generated. In one embodiment, the voucher 24 record is stored at the remote accounting/ticket generation system 38. In this embodiment, the voucher information is preferably transmitted to the central host 34 at some time, or the host 34 requests verification from the remote accounting/ticket generation system 38. For example, at the time a voucher 24 is redeemed, such as described below, the central host 34 may send a signal to the remote accounting/ticket generation system 38 which causes the remote accounting/ticket generation system 38 to forward the voucher record or information, or which causes the remote accounting/ticket generation system 38 to verify the voucher against the stored voucher information.

In another embodiment, when the remote accounting/ticket generation system 38 is utilized to generate a voucher 24, voucher identification information is generated at the central host 34 and then forwarded to the remote accounting/ticket generation system 38. For example, the remote accounting/ticket generation system 38 may generate a request which is forwarded to the central host 34. In response, the central host 34 may generate voucher 24 information. The voucher information may be stored in records at the central host 34. The information may be forwarded to the remote accounting/ticket generation system 38 for use in generating, i.e. printing, the vouchers 24.

Preferably, when a voucher 24 is redeemed, the authenticity of the voucher 24 is confirmed, and the status of the voucher 24 and related information is updated. A voucher 24 may be presented or redeemed in a variety of manners. For example, a player having a voucher 24 may travel to a gaming machine 22 which is arranged to accept vouchers 24 and utilize the voucher 24 to provide the necessary credit to entitle the player to play the game. In one or more embodiments, the player is not limited to presenting the voucher 24 to the same gaming machine 22 which issued it, but may present it to any gaming machine 22 associated with the system 20.

In accordance with the invention, the validating mechanism is also arranged to verify the authenticity of the voucher 24 which is supplied by a player. In one embodiment, the gaming machine 22 includes validating mechanism for reading the bar code 32 and sending the validation code 30 or other identifying information for that voucher 24 represented by the bar code 32 to the central host 34. The central host 34 may then confirm whether the voucher 24 is valid and the value which it represents.

If the central host 34 indicates that the voucher 24 is valid, then the gaming machine 22 is arranged to credit the player the value of that voucher 24. Further, a transaction record associated with the gaming machine 22 is updated, which record makes it possible to determine the total value of all bill monies and vouchers 24 accepted by that particular gaming machine.

As provided above, the central host 34 may verify the authenticity or validity of a particular voucher 24 by comparison to a voucher record. As stated above, in one embodiment, the record or records may be stored at the central host 34. In a preferred embodiment, the information is at some time stored at the remote accounting/ticket generation system 38. In that event, the central host 34 accesses the information from the remote accounting/ticket generation system 38.

In one or more embodiments, the verification includes matching the voucher code 30 read from the voucher 24 against the voucher records 24 to determine that a voucher 24 having the particular code was authorized and issued. Next, the verification includes determining that the voucher 24 is indicated as outstanding and not already paid. The verification may also include confirming the value of the voucher 24.

In one or more embodiments, once the voucher 24 is accepted, verified and its value credited, the voucher record is updated. In one embodiment, the voucher record may be updated to reflect that the voucher 24 has been paid and is no longer outstanding. In this manner, if the voucher 24 is thereafter stolen and re-presented, during the verification step the voucher 24 will be identified as previously presented and will not be paid again. In this method, the step of updating may comprise the writing or rewriting of the voucher record stored at the central host 34 or at the remote accounting/ticket generation system 38.

Figure 3:
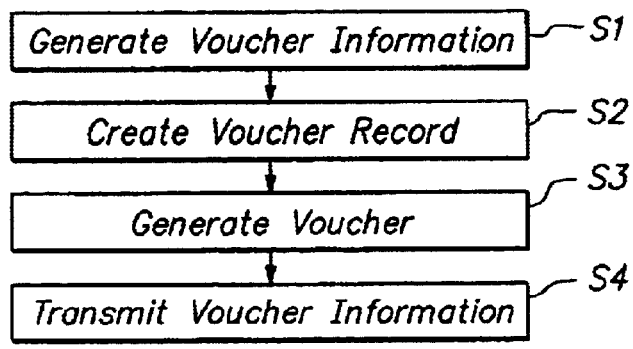
FIG. 3 is a flow diagram illustrating a method of the present invention.

An embodiment of the ticket generation and accounting method of the invention will be described with reference to FIG. 3. In a first step S1, information regarding a voucher is generated. As stated above, this information may be generated at a central host or at the remote accounting/ticket generation system. In a second step S2, a record including voucher data is created. As stated above, this step may comprise the generation of a file. In a step S3, the voucher is generated, such as by printing the voucher at a printer of the remote accounting/ticket generation system. In a step S4, the voucher information is transmitted from the remote accounting/ticket generation system to the central host or other location. This step may comprise the transmission of the one or more voucher records.

As another aspect of the invention, the remote accounting/ticket generation 38 includes a voucher processing device 54. In a preferred embodiment, the voucher processing device 54 is adapted to accept vouchers and dispense coins and/or currency. In one embodiment, the device comprises a Cassomat Casino Royal Model RC F3 manufactured by Perconta of Germany. This device 54 is adapted to accept vouchers 24 and, subject to verification as described above, dispense coins or currency having the value represented by the voucher 24. Of course, other devices arranged to perform these functions may also be utilized.

In one or more embodiments, the remote accounting/ticket generation systems 38 may comprise or include stand-alone voucher generation devices. In one embodiment, the remote accounting/ticket generation system 38 comprise a stand-alone device, such as a kiosk or workstation, which any user may access. In one embodiment, a player provides credit, such as with coin(s), currency or credit (such as with a credit card or bank debit card), and a voucher 24 is generated. The player may then utilize the voucher 24 at any gaming machine 22 which is adapted to accept a voucher.

In another embodiment, one or more ticket generation devices may be associated with a remote accounting/ticket generation system 38. For example, a plurality of customer stations including input devices and voucher generators may be associated with a single remote accounting/ticket generation system 38. The customer station may include a keypad, touchscreen or other input device by which a player may interact with the device for obtaining a voucher. The customer station may also include a printer for printing a voucher 24. Of course, the customer station may include coin and bill/currency acceptors for accepting credit from a player. The customer station may also include a card reader or similar device for accepting credit via a credit card or the like.

In a preferred embodiment, the customer station communicates with the remote accounting/ticket generation system 38 to provide credit data and for obtaining voucher information, such as print code information. Preferably, the voucher information, such as a voucher record, is stored at the remote accounting/ticket generation system 38.

In a preferred embodiment of the invention, the remote accounting/ticket generation system 38 and gaming system 20 are associated, but tasks are divided or distributed so as to optimize the efficiency of the overall system. In one or more embodiments, voucher or ticket generation functions are primarily accomplished by the remote accounting/ticket generation systems 38. Voucher processing, such as the actual voucher acceptance and issuance of monies or credits, is primarily performed by the gaming machines 22 or other parts of the system 20 other than the remote accounting/ticket generation systems 38. Preferably, the voucher or ticket accounting functions, however, are distributed between the central host 34 and the one or more remote accounting/ticket generation systems 38. For example, as stated above, when accounting for a particular voucher, a voucher record may be associated with either the central host 34 or the remote accounting/ticket generation system 38.

In one or more embodiments, it is preferred that the remote accounting/ticket generation systems 38 be capable of generating vouchers without the need for a real-time connection with the remainder of the system 20. As will be appreciated, if the remote accounting/ticket generation system 38 is located remote from the remainder of the system, then establishing a continual data link between the remote accounting/ticket generation system 38 and the remainder of the system 20, including the central host 34, may be difficult and expensive. In one or more embodiments, such a data link is only established at one or more particular times, at which time batches of information is transmitted back and forth. For example, preferably a communication link is established between the remote accounting/ticket generation system 38 and the central host 34 when a large number of vouchers 24 have been generated, and by which the record(s) for these vouchers 24 may be transmitted to the central host 34 in a short period of time. The communication link may be established for such a purpose at various time intervals, or upon the occurrence of other events, such as the generation of a predetermined number of vouchers 24.

In one or more embodiments, the apparatus includes means for establishing a communication link. Such means are well known in the art and may include a modem, wireless communications or other device.

In one or more embodiments, the vouchers 24 which are generated or issued by the remote accounting/ticket generation device 38 may be of a variety of types. In one embodiment, the vouchers may comprise "promotional" vouchers which are issued to a player without requiring the player to provide the value of the voucher. For example, a tour operator may arrange a tour for a number of players, the tour including transportation and lodging. As part of the tour, the tour operator may offer to the patrons promotional vouchers which the patrons may utilize during their trip. The vouchers may be accepted by one or more gaming operators. The tour operator may pay all or a part of the value of the vouchers which are issued to the gaming operator, or the gaming operator may allow the tour operator to provide them at no cost. In one or more other embodiments, the vouchers may be used to obtain goods or services.

The vouchers 24 may comprise compensation vouchers. For example, in the event a player expends money at a casino, such as by buying goods, staying at an associated hotel or buying food, the operator of the casino may compensate or reward that player with one or more vouchers 24 having value which the player may use to play a gaming device. A gaming operator may also reward a player for their play of gaming devices over time by issuing to the player one or more vouchers 24.

The methods and apparatus of the invention have many advantages. First and foremost, a distributed system is described which permits the issuance or generation of tickets, and the accounting or verification of tickets.

The system permits vouchers or tickets to be generated and printed/issued at a location remote from the site or sites where the tickets or vouchers may be utilized. At the same time, the system includes a distributed accounting function permitting verification of tickets or vouchers issued at one location and redeemed at another. The system does not require, however, that the remote ticket generation location be in continuous communication with the remainder of the system, including the location(s) where the tickets are redeemed.

An advantage of this system is that it avoids the need for the gaming operator to print tickets or vouchers and send them to other parties for distribution. This saves time and money. For example, this avoids the need for a remotely located tour operator wishing to distribute vouchers to tour-goers to place an order for the tickets and then wait for the tickets to be delivered. Instead, the tour operator can print the tickets or vouchers directly, at a convenient time and in accordance with present need.

In the case of promotional vouchers or tickets, the vouchers may be printed remote from the gaming devices where they are used. On the other hand, the authenticity of each voucher is established before they are accepted. By "authenticity" it is meant ensuring that the voucher is property payable. As stated above, this may include confirming the existence (i.e., generation) of the voucher and determining whether or not it was previously paid. Further, the system of the invention permits tracking of the vouchers, such as by providing information regarding the status of a voucher. In one embodiment, the status of a voucher is known, such as by indicating it is outstanding or has been redeemed. In accordance with the invention, the status of a voucher may be changed. For example, a promotional voucher may be arranged to expire a certain time after its issuance. The record regarding such vouchers may be updated after the expiration of the stated time to indicate that the voucher is no longer valid and can not be accepted.

Another advantage of the system relates to its distributed arrangement. In this arrangement, the hardware and software which is necessary to accomplish the functions of the entire gaming system are reduced. For example, verification software may be resident only at the central host 34, while the ticket generation software may be resident with only the remote accounting/ticket generation system(s) 38.

It will be understood that the above described arrangements of apparatus and the method therefrom are merely illustrative of applications of the principles of this invention and many other embodiments and modifications may be made without departing from the spirit and scope of the invention as defined in the claims.

We claim:

1. A method of gaming play on a conventional gaming machine, configured for conventional gaming play thereon, utilizing a voucher comprising:

generating data regarding a voucher to be printed, said data including a value representative of a number of credits redeemable for play of at least one game on said gaming machine;

creating a data record regarding said voucher;

storing said data record at a host remote from said gaming machine;

issuing said voucher at a location remote from said gaming machine and said host;

accepting said voucher at said gaming machine for said redeemable play;

transmitting information from said gaming machine to said host regarding the identity of said voucher;

comparing at said host said transmitted information and said data in said data record to verify said voucher;

if said voucher is verified, crediting the number of credits which the voucher represents for use at said gaming machine;

accepting one or more of said credits as a wager for said redeemable play of a game presented by said gaming machine;

debiting a number of credits from said credited number of credits based upon the number of credits used to place said wager; and presenting gaming play of said game on said gaming machine upon placing of said wager, wherein depending upon one of a winning outcome and a losing outcome, adding and subtracting credits from the credited number of credits, respectively.

2. The method in accordance with claim 1 including awarding said voucher to a user independent of said user paying value to receive said voucher.

3. The method in accordance with claim 1 including the storing information regarding the prior use of said voucher once said voucher is verified, preventing said voucher from being verified for use at a later time.

4. The method in accordance with claim 1 wherein said voucher has no value independent of said associated number of credits usable to play said gaming machine.

5. The method in accordance with claim 1 wherein the outcome of said game is determined independent from the voucher presented.

6. A gaming system including at least one conventional gaming machine in which a voucher may be applied for redemption of credits for play of said gaming machine, said gaming system comprising:
- at least one conventional gaming machine configured to present a game for conventional gaming play thereon;
- at least one voucher generating station remote from said at least one gaming machine;
- at least one host remote from said at least one gaming machine and said at least one host;
- one or more communication links permitting information to be transmitted between said at least one gaming machine and said at least one host and between said at least one voucher generating station and said at least one host;
- said at least one voucher generating station configured to generate information regarding said voucher and transmit said information to said host and to generate said voucher by printing said voucher;
- said at least one host configured to store information regarding said voucher, including at least a portion of said information regarding said voucher transmitted from said voucher generating station; and
- said gaming machine configured to accept said voucher for redemption thereof, transmit information from said voucher to said host for comparison to said stored information to verify said voucher and to provide a number of credits which said voucher represents for use by said player if said voucher is verified and to accept one or more of said credits as a wager and to present said game to said player on said gaming machine upon said player's placing said wager, wherein depending upon one of a winning outcome and a losing outcome, credits are added and subtracted from the credited number of credits, respectively.

7. The gaming system in accordance with claim 6 wherein said gaming machine is configured to present said game having an outcome which is independent of said accepted voucher.

8. The gaming system in accordance with claim 6 wherein said gaming machine is configured to reduce said number of credits based upon said wager.

9. The gaming system in accordance with claim 6 wherein said voucher has no value independent of said associated credits.

* * * * *